US009199581B2

United States Patent
Ishibashi et al.

(10) Patent No.: US 9,199,581 B2
(45) Date of Patent: Dec. 1, 2015

(54) VEHICLE STORAGE TRAY

(71) Applicant: HONDA MOTOR CO., LTD., Tokyo (JP)

(72) Inventors: Takehiro Ishibashi, Oura-gun (JP); Yoshinori Asahi, Hiki-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/469,962

(22) Filed: Aug. 27, 2014

(65) Prior Publication Data

US 2015/0069776 A1 Mar. 12, 2015

(30) Foreign Application Priority Data

Sep. 6, 2013 (JP) .................................. 2013-185231

(51) Int. Cl.
*B60R 13/10* (2006.01)
*B60R 7/06* (2006.01)
*B60R 7/04* (2006.01)

(52) U.S. Cl.
CPC .... *B60R 7/06* (2013.01); *B60R 7/04* (2013.01)

(58) Field of Classification Search
CPC ............ B01D 3/32; B01D 3/166; C07C 7/11; A01G 9/104; A47F 3/14; B65G 2203/044; B65G 43/10; A47D 1/008; A47D 3/60; A63H 33/00
USPC ............ 296/24.34; 206/216, 443, 521.8, 564, 206/714
See application file for complete search history.

(56) References Cited

U.S. PATENT DOCUMENTS

| | | | | |
|---|---|---|---|---|
| 6,761,388 B2* | 7/2004 | Lein | .................... | B60N 2/4686 296/24.34 |
| 6,851,736 B1* | 2/2005 | Klopp, III | ................. | B60R 7/04 224/926 |
| 7,029,048 B1* | 4/2006 | Hicks | ....................... | B60R 7/04 296/193.04 |
| 7,172,232 B2* | 2/2007 | Chiku | .................... | E05B 83/32 296/24.34 |
| 7,258,381 B2* | 8/2007 | Sturt | ....................... | E05B 83/32 296/24.34 |
| 7,431,365 B2* | 10/2008 | Sturt | .................... | B60N 2/4686 224/539 |
| 7,513,007 B2* | 4/2009 | Chernoff | ................... | A47L 5/24 15/313 |
| 7,533,918 B2* | 5/2009 | Spykerman | .......... | B60N 2/4686 296/24.34 |
| 7,575,263 B2* | 8/2009 | Downey | .................... | B60R 7/04 224/539 |
| 7,708,328 B2* | 5/2010 | Doom | ....................... | B60R 7/06 206/565 |
| 7,770,952 B2* | 8/2010 | Hanzel | ..................... | B60N 3/08 296/24.34 |
| 7,810,969 B2* | 10/2010 | Blackmore | .......... | B60N 2/4686 362/459 |
| 7,922,228 B2* | 4/2011 | Spitler | ................. | B60N 2/4686 296/24.34 |

(Continued)

FOREIGN PATENT DOCUMENTS

| | | |
|---|---|---|
| JP | 60-139551 A | 7/1985 |
| JP | 02-147349 | 12/1990 |

(Continued)

OTHER PUBLICATIONS

Japanese Office Action dated Jul. 14, 2015, with English Translation, 11 pages.

*Primary Examiner* — Kiran B Patel
(74) *Attorney, Agent, or Firm* — Rankin, Hill & Clark LLP (57) ABSTRACT

A vehicle storage tray is a storage tray that is provided on an interior member of a vehicle and that is capable of storing an article includes: a tray bottom section having a placement surface on which the article is placed, wherein a groove section which is downwardly concave is formed on at least part of an outer edge portion of the placement surface of the tray bottom section.

7 Claims, 5 Drawing Sheets

(56) References Cited

U.S. PATENT DOCUMENTS

| | | | | |
|---|---|---|---|---|
| 8,322,769 | B2* | 12/2012 | Kuhlmann | B60K 37/06 224/483 |
| 8,651,546 | B2* | 2/2014 | Vasko | B60R 7/04 296/24.34 |
| 8,789,869 | B2* | 7/2014 | Bouldron | B60R 7/06 292/DIG. 3 |
| 8,919,847 | B2* | 12/2014 | Mather | B60R 7/04 296/24.34 |
| 9,096,177 | B2* | 8/2015 | Boundy | B60R 7/04 |
| 2008/0217943 | A1* | 9/2008 | Iwata | B60R 13/02 296/24.34 |
| 2009/0174207 | A1* | 7/2009 | Lota | B60R 7/04 296/24.34 |
| 2010/0072767 | A1* | 3/2010 | D'Alessandro | B60R 7/04 296/24.34 |
| 2010/0090491 | A1* | 4/2010 | Hipshier | B60R 7/04 296/24.34 |
| 2011/0115246 | A1* | 5/2011 | Beyer | B60R 7/04 296/24.34 |
| 2013/0057011 | A1* | 3/2013 | Yamagishi | B60R 7/04 296/24.34 |
| 2013/0257078 | A1* | 10/2013 | Quijano | B60R 7/04 296/24.34 |
| 2014/0167438 | A1* | 6/2014 | Lambert | B60R 16/02 296/24.34 |

FOREIGN PATENT DOCUMENTS

| | | |
|---|---|---|
| JP | 06-053306 | 7/1994 |
| JP | 2002-316572 | 10/2002 |
| JP | 2004-322924 | 11/2004 |
| JP | 2006-176051 | 7/2006 |

* cited by examiner

VEHICLE STORAGE TRAY

CROSS-REFERENCE TO RELATED APPLICATION

Priority is claimed on Japanese Patent Application No. 2013-185231, filed on Sep. 6, 2013, the contents of which are incorporated herein by reference.

BACKGROUND

1. Field of the Invention

The present invention relates to a vehicle storage tray.

2. Background

A vehicle interior member such as an instrument panel disposed forward of the vehicle interior or a console disposed between a driver seat and a passenger seat is provided with a tray used to store an article.

For example, in Japanese Unexamined Patent Application Publication No. 2002-316572, a tray is provided so as to block an aperture of a console main body. A cup holder having a container shape is formed on one end portion in a longitudinal direction of the tray, and an accessory case (vehicle storage tray) is formed on the other end portion of the tray. The accessory case has a quadrangular aperture. A bottom portion of the accessory case has a placement surface on which an article to be stored is placed. The placement surface of the accessory case is formed to be flat, and the article is stored in a state where a bottom surface of the article is in contact with the placement surface.

SUMMARY

However, in the related art, there is a problem as described below.

Since the article is stored in a state where the bottom surface of the article is in contact with the placement surface, it is necessary to hold lateral surfaces of the article to take the article out from the tray. Therefore, there is a problem that it is difficult to take the stored article out from the tray of the related art compared to a case where an upper surface of an article and a lower surface of the article are supported to take the article out from a tray. In particular, when the article stored in the tray is thin or when there is equipment or the like above the tray, since it is difficult to hold the lateral surfaces of the article stored in the tray, the above problem becomes prominent.

In view of the foregoing, an object of an aspect of the present invention is to provide a vehicle storage tray from which a stored article can be easily taken out.

In order to achieve the above object, a vehicle storage tray according to an aspect of the present invention adopts one of the configurations described below.

(1) An aspect of the present invention is a vehicle storage tray that is provided on an interior member of a vehicle and is capable of storing an article, the tray including: a tray bottom section having a placement surface on which the article is placed, wherein a groove section which is downwardly concave is formed on at least part of an outer edge portion of the placement surface of the tray bottom section.

According to the aspect of (1) described above, since the groove section which is downwardly concave is formed on at least part of the outer edge portion of the placement surface of the tray bottom section, when the article placed on the placement surface is taken out, an end portion of the article is pushed into the groove section, and thereby it is possible to tilt the article upwardly relative to the placement surface and to form a space between the article and the placement surface. Thereby, since a user can insert a finger into the space and hold the article by the upper surface and the lower surface, it is possible to easily take out the article stored in the vehicle storage tray.

(2) In the aspect of (1) described above, a projection section of the interior member may be disposed above the tray bottom section so as to cover the placement surface.

According to the aspect of (2) described above, since the projection section of the interior member is provided above the tray bottom section, it is possible, for example, to efficiently dispose equipment such as an armrest or a shift lever above the tray bottom section.

Since the groove section which is downwardly concave is formed on at least part of the outer edge portion of the placement surface of the tray bottom section, even when the projection section of the interior member is provided above the tray bottom section so as to cover the placement surface, the user can insert a hand into the vehicle storage tray between the tray bottom section and the projection section of the interior member and push the end portion of the article into the groove section, and thereby the user can tilt the article relative to the placement surface and hold the article by the upper surface and the lower surface. Accordingly, even when the projection section of the interior member is provided above the tray bottom section, it is possible to easily take out the article stored in the vehicle storage tray.

(3) In the aspect of (2) described above, a wall section may be provided between the tray bottom section and the projection section, and the groove section may be formed along the wall section in a corner section between and formed by the tray bottom section and the wall section.

According to the aspect of (3) described above, since the groove section is formed along the wall section in the corner section between and formed by the tray bottom section and the wall section, when the article placed on the placement surface is taken out, the end portion of the article is pressed into the groove section while being pushed against the wall section, and thereby it is possible to reliably tilt the article upwardly relative to the placement surface and to form a space between the article and the placement surface. Accordingly, the user can further easily take out the article stored in the vehicle storage tray.

(4) In the aspect of any one of (1) to (3) described above, the interior member may be a center console, and the groove section may be formed along a front-rear direction of the vehicle.

According to the aspect of (4) described above, since the interior member is the center console and the groove section is formed along the front-rear direction of the vehicle, the user can insert a hand from the outside of the center console toward the vehicle storage tray, tilt the article upwardly relative to the placement surface, and hold the article by the upper surface and the lower surface. Accordingly, the center console can be provided with the vehicle storage tray, and it is also possible to easily take out the article stored in the vehicle storage tray.

(5) In the aspect of any one of (1) to (3) described above, the interior member may be an instrument panel, and the groove section may be formed along a right-left direction of the vehicle.

According to the aspect of (5) described above, since the interior member is the instrument panel and the groove section is formed along a right-left direction of the vehicle, the user can insert a hand from the vehicle interior side toward the vehicle storage tray, tilt the article upwardly relative to the placement surface, and hold the article by the upper surface and the lower surface. Accordingly, the instrument panel can be provided with the vehicle storage tray, and it is also possible to easily take out the article stored in the vehicle storage tray.

(6) In the aspect of any one of (1) to (5) described above, a lateral surface that is connected to the placement surface and is one of lateral surfaces of the groove section may be a tilted surface that upwardly tilts toward the inside of the tray bottom section from the outside of the tray bottom section.

According to the aspect of (6) described above, since the lateral surface that is connected to the placement surface and is one of a plurality of lateral surfaces of the groove section is the tilted surface that upwardly tilts toward the inside of the tray bottom section from the outside of the tray bottom section, when the end portion of the article is pushed into the groove section and the article is upwardly tilted relative to the placement surface to form the space between the article and the placement surface, it is possible to tilt the article stably along the inclined surface of the groove section. Accordingly, it is possible to further easily take out the article stored in the vehicle storage tray. In addition, by setting the inclination angle of the inclined surface of the groove section to a desired angle, it is possible to set the size of the space formed between the article and the placement surface when the article is tilted, to a desired size. Accordingly, it is possible to easily design the vehicle storage tray from which the stored article can be easily taken out.

(7) In the aspect of any one of (1) to (6) described above, the tray bottom section may be surrounded by a peripheral wall.

According to the aspect of (7) described above, since the tray bottom section is surrounded by the peripheral wall, it is possible to prevent the article placed on the placement surface of the tray bottom section from falling down from the vehicle storage tray, for example, due to vibration or the like occurring when the vehicle is running.

According to an aspect of the present invention, since the groove section which is downwardly concave is formed on at least part of the outer edge portion of the placement surface of the tray bottom section, when the article placed on the placement surface is taken out, the end portion of the article is pushed into the groove section, and it is thereby possible to tilt the article upwardly relative to the placement surface and to form a space between the article and the placement surface. Thereby, since the user can insert a finger into the space and hold the article by the upper surface and the lower surface, it is possible to easily take out the article stored in the vehicle storage tray.

DESCRIPTION OF THE EMBODIMENTS

Figure 1:
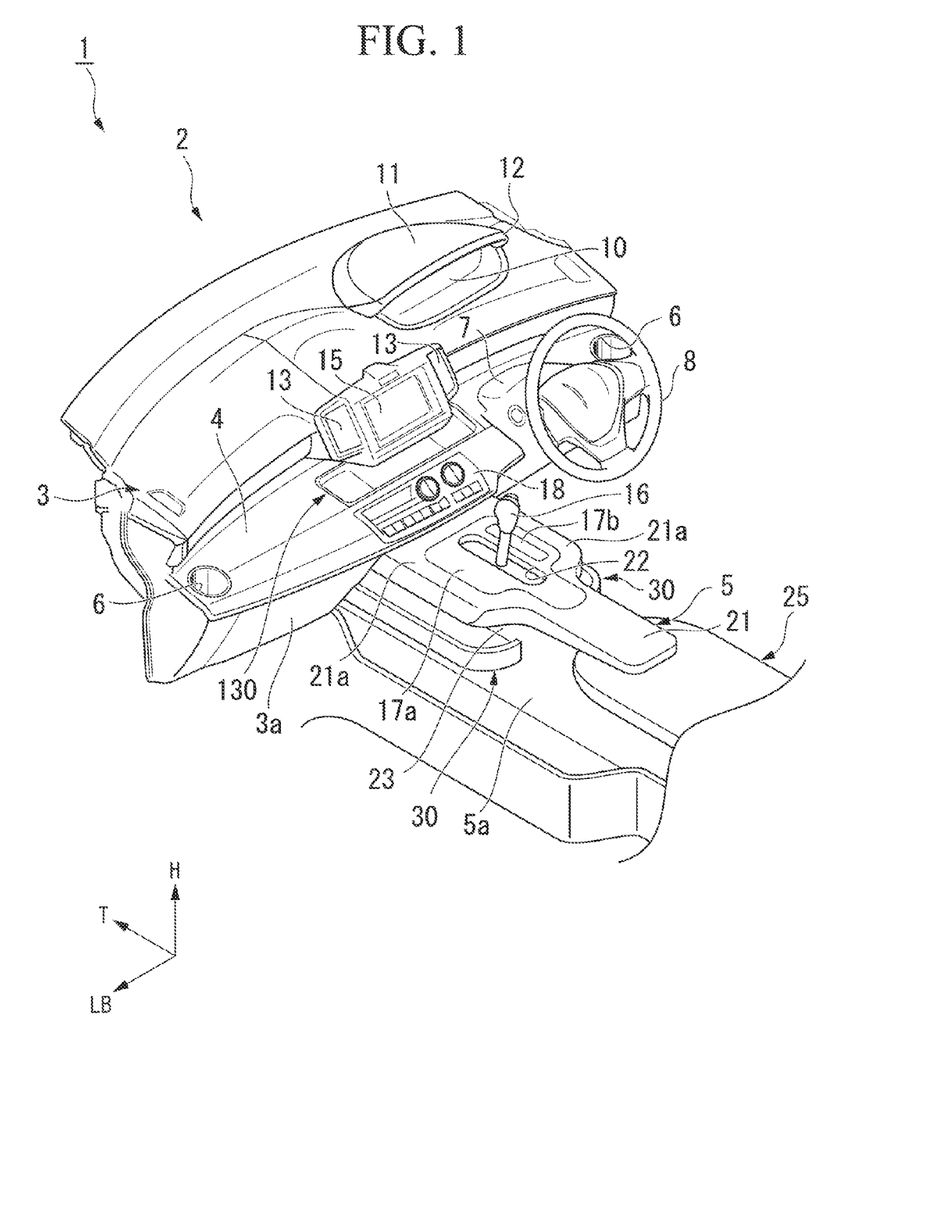
FIG. 1 is an explanation drawing of a vehicle interior in a vehicle provided with a storage tray according to an embodiment.

FIG. 1 is an explanation drawing of a vehicle interior 2 in a vehicle 1 provided with a storage tray 30 (vehicle storage tray) according to an embodiment. Note that, it is supposed that front, rear, right, and left directions in the following description are the same as front, rear, right, and left directions of the vehicle 1 shown in FIG. 1 if there is no particular description. In addition, in the drawings, an arrow T indicates the front of the vehicle 1, an arrow LB indicates the left of the vehicle 1, and an arrow H indicates the upside of the vehicle 1. In addition, an example of a so-called right-hand-drive vehicle 1 will be described below. In addition, for ease of understanding, in FIG. 1, a driver seat and a passenger seat are not shown in the drawing.

As shown in FIG. 1, the vehicle 1 includes an instrument panel 3 provided forward of a vehicle interior 2 and a center console 5 (interior member) disposed between a driver seat of the vehicle 1 and a passenger seat of the vehicle 1.

A panel step section 4 that projects rearwardly is provided on an intermediate portion in an up-down direction of the instrument panel 3.

On the right of the panel step section 4, a steering wheel 8 is provided via a steering column 7. A drink holder 6 is provided on each of both end portions in a right-left direction of the panel step section 4.

A meter 10 that displays information such as a vehicle speed toward a driver (user), a visor 11 disposed so as to cover the upside of this meter 10, and a visor cover 12 disposed so as to cover the periphery of the meter 10 are provided above the steering wheel 8.

A navigation unit 15 is provided on an intermediate portion in the right-left direction of the instrument panel 3 and more upward than the panel step section 4. The navigation unit 15 is provided so as to protrude rearwardly and disposed so as to cover an intermediate portion in the right-left direction of the panel step section 4 from the upside. An air conditioner air outlet 13 is provided on each of both sides in the right-left direction of the navigation unit 15.

In addition, an air conditioner operation unit 18 used to change a preset temperature or the like of the air conditioner is provided on an intermediate portion in the right-left direction of the panel step section 4.

The center console 5 is provided rearward of the instrument panel 3 so as to extend along the front-rear direction of the vehicle 1 toward the rearward of the vehicle 1 from a rear-end wall section 3a below the panel step section 4.

The center console 5 mainly includes a garnish 21 provided above, an armrest 25 connected to a rear end portion of the garnish 21, a lateral wall section 23 that supports the garnish 21 and the armrest 25, and a pair of storage trays 30 each being provided more downward than the garnish 21 and on both sides in the right-left direction which interpose the lateral wall section 23.

The garnish 21 covers a shift device (not shown in the drawing) provided within a main body section 5a of the center console 5 from the upside and also forms a design surface that garnishes the center console 5.

On a central part of the garnish 21, a slit 22 that penetrates through the garnish 21 is provided along the front-rear direction. A shift lever 16 protrudes from the slit 22. The shift lever 16 is joined via the slit 22 to the shift device provided internally in the center console 5.

A position of the garnish 21, the position corresponding to the shift lever 16, is formed wider in the right-left direction than the main body section 5a of the center console 5 and forms a projection section 21a that projects in the right-left direction. An escutcheon 17a, a shift indicator 17b, or the like is disposed on the projection section 21a of the garnish 21.

The armrest 25 is provided rearward of the garnish 21. The armrest 25 is connected to the rear end portion of the garnish 21 and is provided to extend along the front-rear direction of the vehicle 1. The armrest 25 has a predetermined width in the right-left direction and is configured such that the user seated in the driver seat or the passenger seat is capable of placing an elbow or the like thereon.

The lateral wall section 23 is provided below the garnish 21 and the armrest 25, and between the projection section 21a and a tray bottom section 31 described below. The lateral wall section 23 supports the garnish 21 and the armrest 25, is provided to extend along the front-rear direction of the vehicle 1, and forms both lateral surfaces of the main body section 5a of the center console 5.

The center console 5 is provided with the pair of storage trays 30 capable of storing an article. Each of the pair of storage trays 30 is provided so as to project in the right-left direction from the lateral wall section 23 below the projection section 21a of the garnish 21. Note that, the storage trays 30 have a symmetrical shape to each other with respect to the center console 5 interposed therebetween and have the same configuration. Accordingly, only the storage tray 30 of the passenger seat side (left side) will be described below, and a detailed description of the storage tray 30 of the driver seat side (right side) will be omitted.

The storage tray 30 is formed in a box shape having an opening upward as a whole and is provided to extend along the front-rear direction of the vehicle 1.

Figure 2:
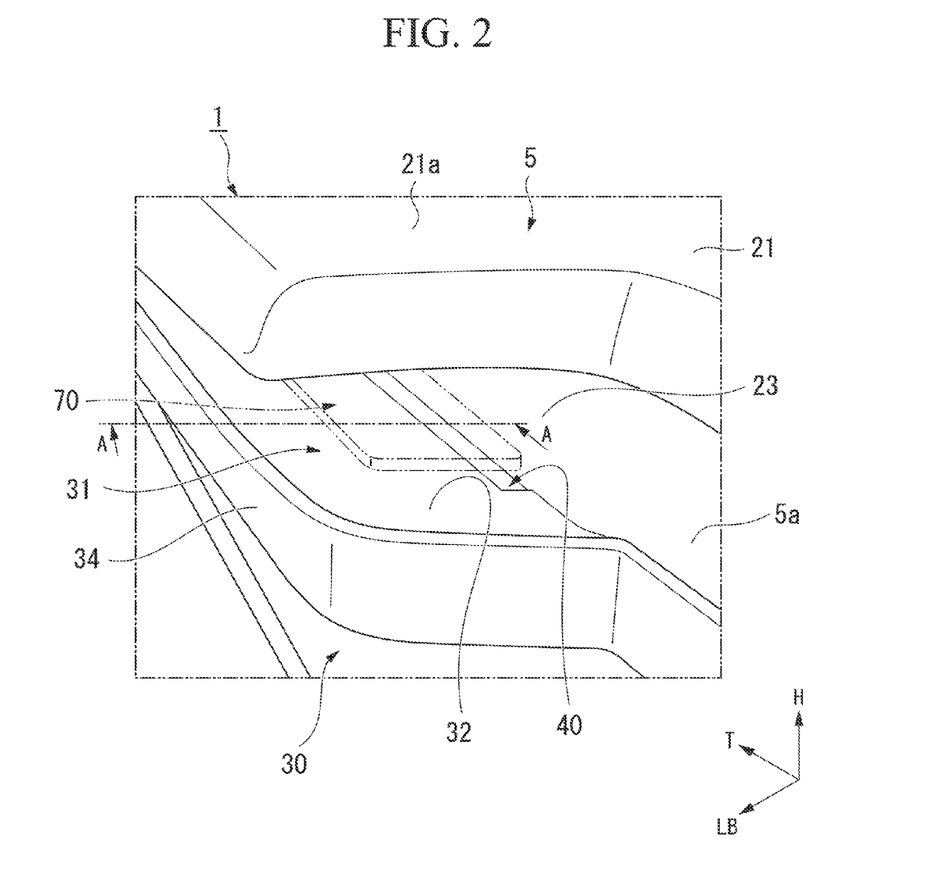
FIG. 2 is an enlarged view of the storage tray according to the embodiment.

FIG. 2 is an enlarged view of the storage tray 30 according to the embodiment. Note that, FIG. 2 is an enlarged view of the storage tray 30 provided on the passenger seat side. In addition, in FIG. 2, an article 70 stored in the storage tray 30 is shown in the drawing by a two-dot chain line.

As shown in FIG. 2, the article 70 is stored in the storage tray 30. The article 70 stored in the storage tray 30 is not specifically limited if the article has a storable size. In the present embodiment, an example of a portable information terminal such as a so-called smartphone is described as the article 70 stored in the storage tray 30.

The storage tray 30 includes the tray bottom section 31 and a peripheral wall section 34.

The tray bottom section 31 is formed to be flat along a horizontal plane and has a placement surface 32 on which the article 70 is placed. The projection section 21a of the garnish 21 is disposed above the tray bottom section 31 and face-to-face with the placement surface 32.

The peripheral wall section 34 is provided to stand upwardly from a left edge portion of the tray bottom section 31 and a rear edge portion of the tray bottom section 31 and is formed continuously from the left edge portion of the tray bottom section 31 to the rear edge portion of the tray bottom section 31. Thereby, the placement surface 32 of the tray bottom section 31 is surrounded by the rear-end wall section 3a (refer to FIG. 1, peripheral wall) of the instrument panel 3, the lateral wall section 23 (peripheral wall), and the peripheral wall section 34 (peripheral wall). Accordingly, the article 70 stored in the storage tray 30 is prevented from falling down from the storage tray 30 due, for example, to vibration or the like occurring when the vehicle 1 is running.

Figure 3:
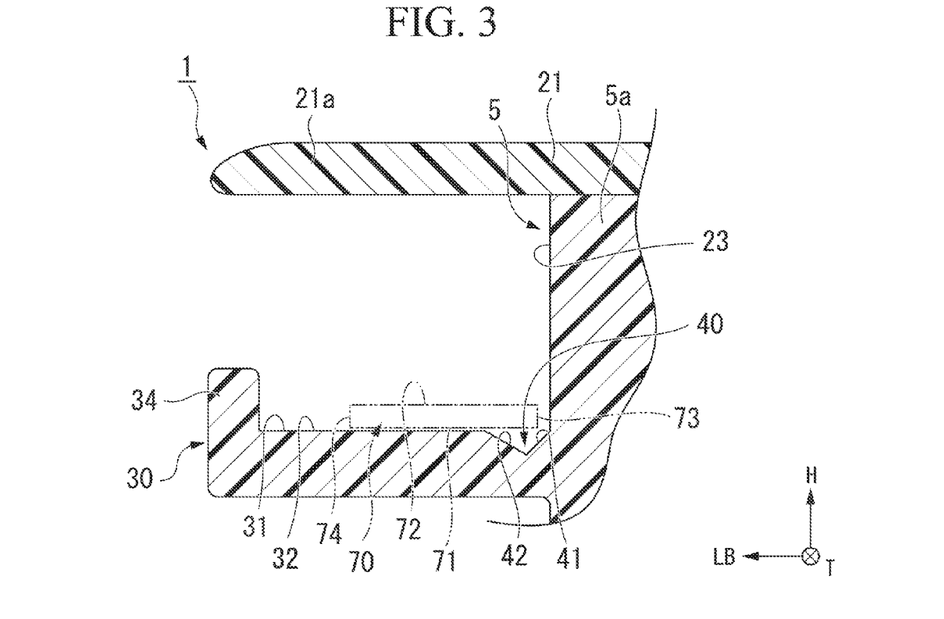
FIG. 3 is a cross-sectional view along an A-A line of FIG. 2.

FIG. 3 is a cross-sectional view along an A-A line of FIG. 2. Note that, in the following description, an outer edge portion side of the placement surface 32, when looking from a central part of the placement surface 32 of the tray bottom section 31, may be referred to as "outside of the tray bottom section 31", and the central part side of the placement surface 32, when looking from the outer edge portion of the placement surface 32 of the tray bottom section 31, may be referred to as "inside of the tray bottom section 31".

As shown in FIG. 3, on the tray bottom section 31, a groove section 40 is formed in a corner section which is the outer edge portion of the placement surface 32 and is between and defined by the tray bottom section 31 and the lateral wall section 23. The groove section 40 is downwardly concave and is formed along the front-rear direction of the vehicle 1 from a front end portion of the tray bottom section 31 to a rear end portion of the tray bottom section 31.

The groove section 40 is formed by a first lateral surface 41 positioned on the lateral wall section 23 side (outside of the tray bottom section 31) and a second lateral surface 42 (lateral surface) positioned on the opposite side (inside of the tray bottom section 31) of the lateral wall section 23, to have a V shape in cross-sectional view.

The first lateral surface 41 is connected to the lateral wall section 23. The first lateral surface 41 is a tilted surface that downwardly tilts as being away from the lateral wall section 23 (toward the inside of the tray bottom section 31 from the outside of the tray bottom section 31).

The second lateral surface 42 is connected to the placement surface 32. The second lateral surface 42 is a tilted surface that upwardly tilts away from the lateral wall section 23 (toward the inside of the tray bottom section 31 from the outside of the tray bottom section 31).

Figure 4:
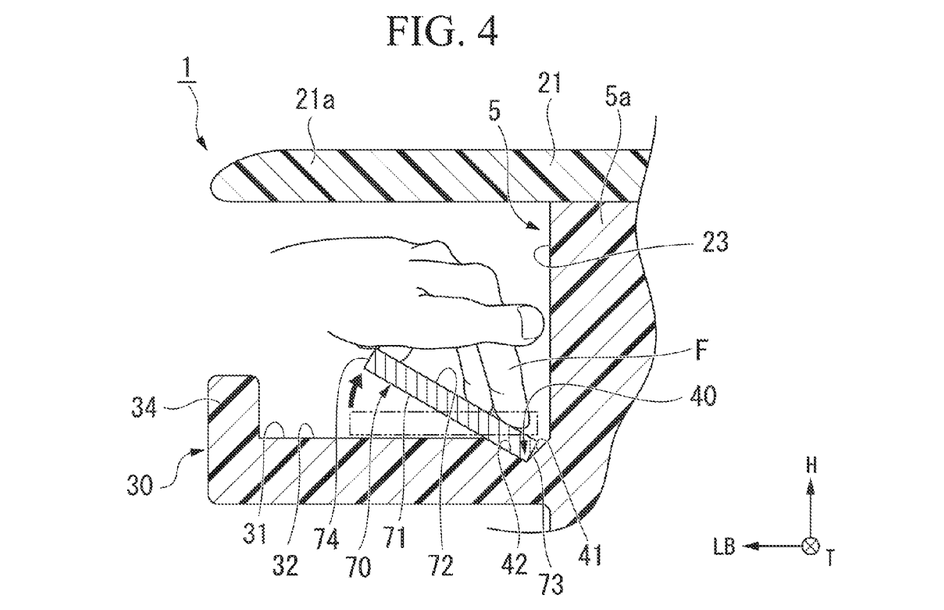
FIG. 4 is an explanation drawing when an article is taken out from the storage tray.

FIG. 4 is an explanation drawing when the article 70 is taken out from the storage tray 30. Note that, in FIG. 4, the article 70 in a state where the article is placed on the placement surface 32 and is stored in the storage tray 30 is shown in the drawing by a two-dot chain line, and the article 70 in a state where the article is held by the user in the storage tray 30 is shown in the drawing by a solid line.

The storage tray 30 configured as described above provides operations and advantages as described below.

As shown in FIG. 4, when the article 70 placed on the placement surface 32 is taken out from the storage tray 30, the user first inserts a hand between the tray bottom section 31 and the projection section 21a of the garnish 21.

Next, the user moves the article 70 toward the lateral wall section 23, pushes a first end portion 73 of the article 70 on the side of the lateral wall section 23 against the lateral wall section 23, and presses the first end portion 73 of the article 70 toward the groove section 40. Thereby, the article 70 is arranged such that a first principal surface 71 is positioned along a slope of the second lateral surface 42 of the groove section 40. At this time, a second end portion 74 of the article 70 on the opposite side of the first end portion 73 is lifted and separated away from the placement surface 32. Then, a space is formed between the first principal surface 71 of the article 70 and the placement surface 32 of the storage tray 30.

Next, the user inserts any finger F of the user into the space formed between the first principal surface 71 of the article 70 and the placement surface 32 of the storage tray 30 and holds the article 70 by the first principal surface 71 of the article 70 and the second principal surface 72 of the article 70. Thereby, the user can take out the article 70 between the tray bottom section 31 and the projection section 21a of the garnish 21 in a state where the article 70 is stably held.

According to the present embodiment, since the groove section 40 which is downwardly concave is formed on the outer edge portion of the placement surface 32 of the tray bottom section 31, when the article 70 placed on the placement surface 32 is taken out, the first end portion 73 of the article 70 is pushed into the groove section 40, and thereby it is possible to tilt the article 70 upwardly relative to the placement surface 32 and to form a space between the article 70 and the placement surface 32. Thereby, since the user can insert any finger F into the space between the article 70 and the placement surface 32 and hold the first principal surface 71 of the article 70 and the second principal surface 72 of the article 70, it is possible to easily take out the article 70 stored in the storage tray 30.

In addition, since the projection section 21a of the garnish 21 that configures the center console 5 is provided above the tray bottom section 31, it is possible, for example, to efficiently dispose the escutcheon 17a of the shift lever 16, the shift indicator 17b of the shift lever 16, or the like above the tray bottom section 31. Since the groove section 40 which is downwardly concave is formed on the outer edge portion of the placement surface 32 of the tray bottom section 31, even when the projection section 21a of the garnish 21 is provided above the tray bottom section 31 so as to cover the placement surface 32, the user can insert a hand into the storage tray 30 between the tray bottom section 31 and the projection section 21a of the garnish 21, tilt the article 70 relative to the placement surface 32, and hold the article by the upper surface of the article and the lower surface of the article. Accordingly, even when the projection section 21a of the garnish 21 is provided above the tray bottom section 31, it is possible to easily take out the article 70 stored in the storage tray 30.

In addition, since the groove section 40 is formed along the lateral wall section 23 in the corner section between and defined by the tray bottom section 31 and the lateral wall section 23, when the article 70 placed on the placement surface 32 is taken out, the first end portion 73 of the article 70 is pressed into the groove section 40 while being pushed against the lateral wall section 23, and thereby it is possible to reliably tilt the article 70 upwardly relative to the placement surface 32 and to form a space between the article 70 and the placement surface 32. Accordingly, the user can further easily take out the article stored in the storage tray 30.

In addition, since the interior member of the vehicle 1 provided with the storage tray 30 is the center console 5 and the groove section 40 is formed along the front-rear direction of the vehicle 1, the user can insert a hand from the outside of the center console 5 toward the storage tray 30, tilt the article 70 upwardly relative to the placement surface 32, and hold the article 70 by the upper surface of the article and the lower surface of the article. Accordingly, the center console 5 can be provided with the storage tray 30, and also it is possible to easily take out the article 70 stored in the storage tray 30.

In addition, since the second lateral surface 42 that is connected to the placement surface 32 and is one of lateral surfaces of the groove section 40 is the tilted surface that upwardly tilts as being away from the lateral wall section 23 (toward the inside of the tray bottom section 31 from the outside of the tray bottom section 31), when the first end portion 73 of the article 70 is pushed into the groove section 40 and the article 70 is upwardly tilted relative to the placement surface 32 to form the space between the article 70 and the placement surface 32, it is possible to tilt the article 70 stably along the second lateral surface 42 of the groove section 40. Accordingly, it is possible to further easily take out the article 70 stored in the storage tray 30. In addition, by setting an inclination angle of the inclined surface of the groove section 40 to a desired angle, it is possible to set the size of the space formed between the article 70 and the placement surface 32 when the article 70 is tilted, to a desired size. Accordingly, it is possible to easily design the storage tray 30 from which the stored article 70 can be easily taken out.

In addition, since the tray bottom section 31 is surrounded by the rear-end wall section 3a of the instrument panel 3, the lateral wall section 23, and the peripheral wall section 34, it is possible to prevent the article 70 placed on the placement surface 32 of the tray bottom section 31 from falling down from the storage tray 30 due, for example, to vibration or the like occurring when the vehicle 1 is running.

Modified Example of the Embodiment

Figure 5:
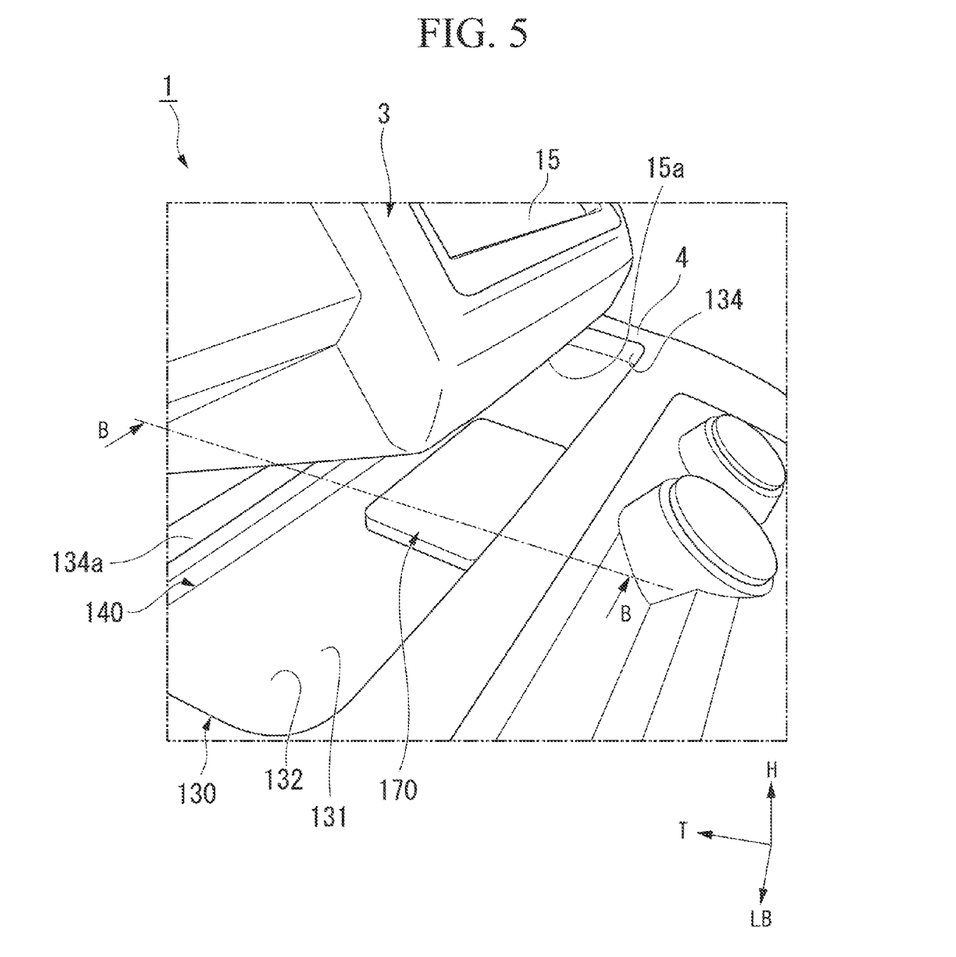
FIG. 5 is an enlarged view of a storage tray according to a modified example of the embodiment.

FIG. 5 is an enlarged view of a storage tray 130 according to a modified example of the embodiment.

Figure 6:
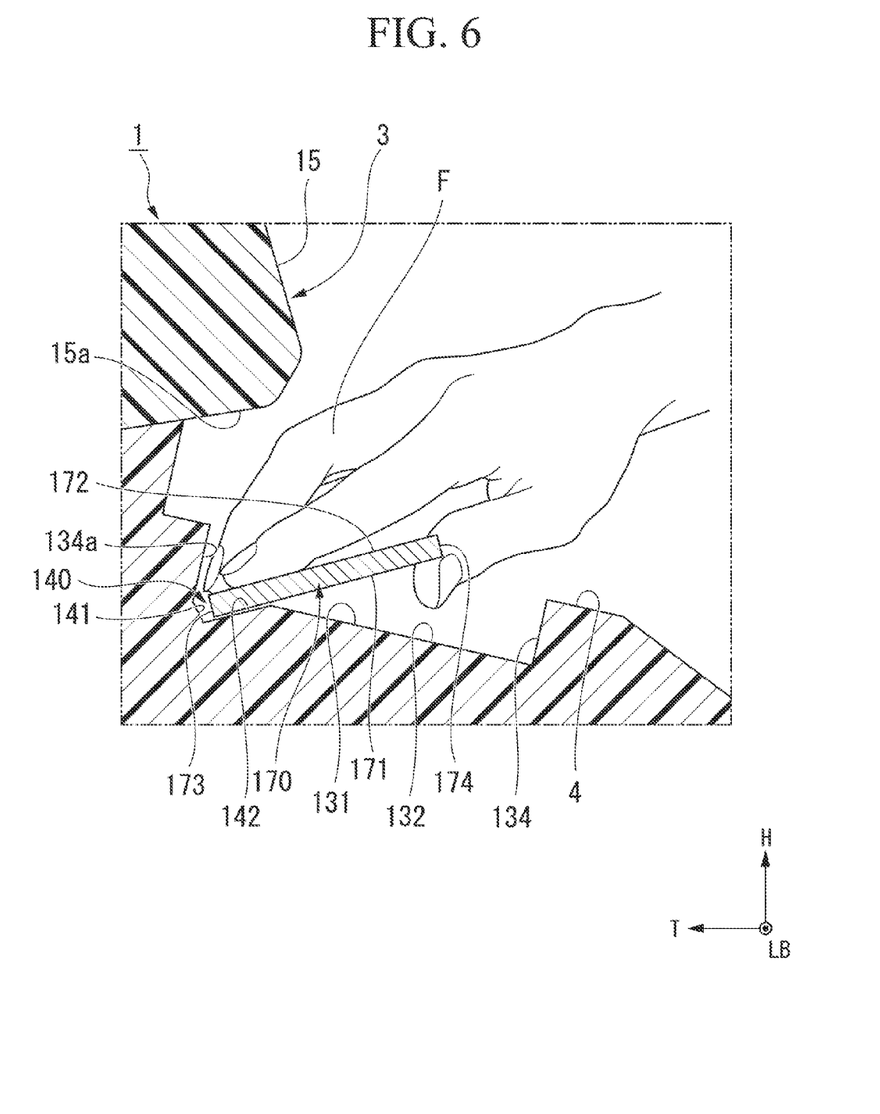
FIG. 6 is a cross-sectional view along a B-B line of FIG. 5 and is an explanation drawing when an article is taken out from the storage tray.

FIG. 6 is a cross-sectional view along a B-B line of FIG. 5 and is an explanation drawing when the user takes an article 170 out from the storage tray 130.

Next, the storage tray 130 according to the modified example of the embodiment will be described with reference to FIG. 1, FIG. 5, and FIG. 6. In the modified example of the embodiment, as shown in FIG. 1, the storage tray 130 provided below the navigation unit 15 will be described.

The storage tray 30 according to the embodiment is provided on the center console 5 and to extend along the front-rear direction of the vehicle 1 (refer to FIG. 2).

On the other hand, the storage tray 130 according to the modified example of the embodiment is different from the storage tray 30 according to the embodiment in that the storage tray 130 is provided on the instrument panel 3 (interior member) and to extend along the right-left direction of the vehicle 1. Note that, in the following description, a detailed explanation of configuration parts similar to those of the embodiment will be omitted.

The storage tray 130 according to the modified example of the embodiment is formed below the navigation unit 15 and on an intermediate portion in the right-left direction of the panel step section 4, to be downwardly concave.

As shown in FIG. 5, the storage tray 130 has an opening upward and is formed in a rectangular shape that extends in the right-left direction, when looking from the upside. A support wall which is a lower portion of the navigation unit 15 forms a projection section 15a that projects rearwardly. The projection section 15a of the navigation unit 15 is provided such that part of the projection section 15a overlaps the opening of the storage tray 130, when looking from the upside.

An article 170 which is, for example, a portable information terminal such as a smartphone is stored in the storage tray 130.

A tray bottom section 131 is slightly tilted downwardly from the front toward the rear. The tray bottom section 131 is formed to be flat and has a placement surface 132 on which the article 170 is placed. The tray bottom section 131 is surrounded by a peripheral wall 134 in the whole circumference.

On the tray bottom section 131, a groove section 140 is formed in a corner section which is the outer edge portion of the placement surface 132 and is between and defined by the tray bottom section 131 and the peripheral wall 134. In the modified example of the present embodiment, the groove section 140 is formed in a corner section between and defined by a forward wall section 134a (wall section) of the peripheral wall 134 and the tray bottom section 131. The groove section 140 is downwardly concave and is formed along the right-left direction of the vehicle 1 over the whole in the right-left direction of the tray bottom section 131.

As shown in FIG. 6, the groove section 140 is formed by a first lateral surface 141 positioned forward and a second lateral surface 142 (lateral surface) positioned rearward, to have a V shape in cross-sectional view.

The first lateral surface 141 is connected to the forward wall section 134a. The first lateral surface 141 is a tilted surface that downwardly tilts as being away from the forward wall section 134a (toward the inside of the tray bottom section 131 from the outside of the tray bottom section 131).

The second lateral surface 142 is connected to the placement surface 132. The second lateral surface 142 is a tilted surface that upwardly tilts as being away from the forward wall section 134a (toward the inside of the tray bottom section 131 from the outside of the tray bottom section 131).

When the article 170 placed on the placement surface 132 is taken out from the storage tray 130, the user first inserts a hand between the tray bottom section 131 and the projection section 15a of the navigation unit 15.

Next, the user moves the article 170 toward the forward wall section 134a, pushes a first end portion 173 of the article 170 against the forward wall section 134a, and presses the first end portion 173 of the article 170 toward the groove section 140. Thereby, the article 170 is arranged such that a first principal surface 171 is positioned along a slope of the second lateral surface 142 of the groove section 140. At this time, a second end portion 174 of the article 170 on the opposite side of the first end portion 173 is lifted and separated away from the placement surface 132. Then, a space is formed between the first principal surface 171 of the article 170 and the placement surface 132 of the storage tray 130.

Next, the user inserts any finger F into the space formed between the first principal surface 171 of the article 170 and the placement surface 132 of the storage tray 130 and holds the article 170 by the first principal surface 171 of the article 170 and the second principal surface 172 of the article 170. Thereby, the user can take out the article 170 between the tray bottom section 131 and the projection section 15a of the navigation unit 15 in a state where the article 170 is stably held.

According to the modified example of the embodiment, since the interior member of the vehicle 1 provided with the storage tray 130 is the instrument panel 3 and the groove section 140 is formed along the right-left direction of the vehicle 1, the user can insert a hand into the storage tray 130 from the vehicle interior 2 side, tilt the article 170 upwardly relative to the placement surface 132, and hold the first principal surface 171 of the article 170 and the second principal surface 172 of the article 170. Accordingly, even when the storage tray 130 is provided on the instrument panel 3, it is possible to easily take out the article 170 stored in the storage tray 130 similar to the original embodiment.

Note that, the technical scope of the present invention is not limited to the above-identified embodiment, and a variety of modifications can be made without departing from the scope of the present invention.

The storage tray 30 provided on the center console 5 is described in the embodiment, and the storage tray 130 provided on the panel step section 4 of the instrument panel 3 is described in the modified example of the embodiment; however, the installation place of each of the storage trays 30, 130 is not limited to the embodiment and the modified example of the embodiment. Accordingly, for example, the storage tray according to an aspect of the present invention may be provided on an interior panel of the door of the vehicle 1.

In the embodiment, the placement surface 32 of the tray bottom section 31 is surrounded by the peripheral wall which is the rear-end wall section 3a of the instrument panel 3, the lateral wall section 23, and the peripheral wall section 34. On the other hand, the placement surface 32 of the tray bottom section 31 may not be surrounded by the peripheral wall.

In addition, in the modified example of the embodiment, the placement surface 132 of the tray bottom section 131 is surrounded by the peripheral wall 134. On the other hand, the placement surface 132 of the tray bottom section 131 may not be surrounded by the peripheral wall.

In the embodiment, the projection section 21a is provided above the tray bottom section 31 so as to cover the placement surface 32; however, the projection section 21a may not be provided.

In addition, in the modified example of the embodiment, the projection section 15a is provided above the tray bottom section 131 so as to cover the placement surface 132; however, the projection section 15a may not be provided.

In the embodiment, the second lateral surface 42 that is connected to the placement surface 32 and is one of lateral surfaces of the groove section 40 is a tilted surface that upwardly tilts toward the inside of the tray bottom section 31 from the outside of the tray bottom section 31. On the other hand, the second lateral surface 42 of the groove section 40 may be provided perpendicular to the placement surface 32.

In addition, in the modified example of the embodiment, the second lateral surface 142 that is connected to the placement surface 132 and is one of lateral surfaces of the groove section 140 is a tilted surface that upwardly tilts toward the inside of the tray bottom section 131 from the outside of the tray bottom section 131. On the other hand, the second lateral surface 142 of the groove section 140 may be provided perpendicular to the placement surface 132.

The formation position of the groove section 40 is not limited to the embodiment; the groove section 40 may be formed on at least part of the outer edge portion of the placement surface 32. Accordingly, for example, the groove section 40 may be formed over the whole circumference of the outer edge portion of the placement surface 32. In addition, as the groove section 40, a plurality of parallel grooves may be formed in a more inward region than the outer edge portion of the placement surface 32 in addition to part of the outer edge portion of the placement surface 32.

In addition, the formation position of the groove section 140 is not limited to the modified example of the embodiment; the groove section 140 may be formed on at least part of the outer edge portion of the placement surface 132. Accordingly, for example, the groove section 140 may be formed over the whole circumference of the outer edge portion of the placement surface 132. In addition, as the groove section 140, a plurality of parallel grooves may be formed in a more inward region than the outer edge portion of the placement surface 132 in addition to part of the outer edge portion of the placement surface 132.

Further, the components of the embodiment described above can be replaced with well-known components without departing from the scope of the present invention.

The invention claimed is:

1. A vehicle storage tray that is provided on an interior member of a vehicle and is capable of storing an article, the tray comprising:
   a tray bottom section having a placement surface on which the article is placed, wherein
   a groove section which is downwardly concave is formed on at least part of an outer edge portion of the placement surface of the tray bottom section.

2. The vehicle storage tray according to claim 1, wherein a projection section of the interior member is disposed above the tray bottom section so as to cover the placement surface.

3. The vehicle storage tray according to claim 2, wherein a wall section is provided between the tray bottom section and the projection section, and
   the groove section is formed along the wall section in a corner section between and formed by the tray bottom section and the wall section.

4. The vehicle storage tray according to claim 1, wherein
the interior member is a center console, and
the groove section is formed along a front-rear direction of the vehicle.

5. The vehicle storage tray according to claim 1, wherein
the interior member is an instrument panel, and
the groove section is formed along a right-left direction of the vehicle.

6. The vehicle storage tray according to claim 1, wherein
a lateral surface that is connected to the placement surface and is one of lateral surfaces of the groove section is a tilted surface that upwardly tilts toward the inside of the tray bottom section from the outside of the tray bottom section.

7. The vehicle storage tray according to claim 1, wherein
the tray bottom section is surrounded by a peripheral wall.

* * * * *